United States Patent [19]
Fujita et al.

[11] Patent Number: 5,589,875
[45] Date of Patent: Dec. 31, 1996

[54] TELEVISION CAMERA HAVING VARIABLE LENS IRIS/SHUTTER BASED ON POSITION/ROTATIONAL SPEED OF CAMERA

[75] Inventors: Shigeru Fujita; Toshio Sakai, both of Yokohama, Japan

[73] Assignee: Matsushita Electric Industrial Co., Ltd., Osaka, Japan

[21] Appl. No.: 344,703

[22] Filed: Nov. 21, 1994

Related U.S. Application Data

[63] Continuation of Ser. No. 891,050, Jun. 1, 1992, abandoned.

[30]      Foreign Application Priority Data

Jun. 17, 1991  [JP]  Japan ................................. 3-144479
Apr. 10, 1992  [JP]  Japan ................................. 4-090528

[51] Int. Cl.$^6$ ..................... H04N 7/18; H04N 9/47
[52] U.S. Cl. ................. 348/143; 348/150; 348/211; 348/363; 348/367; 348/370
[58] Field of Search ........................... 348/143, 146, 348/150, 151, 152, 207, 211, 362, 363–366, 370, 367, 224; H04N 7/18

[56]          References Cited

U.S. PATENT DOCUMENTS

| | | | |
|---|---|---|---|
| 4,120,004 | 10/1978 | Coutta | 348/150 |
| 4,362,218 | 4/1982 | Coutta et al. | 348/150 |
| 4,468,700 | 8/1984 | Smith | 348/366 |
| 4,570,163 | 2/1986 | Smith | 340/825.77 |
| 4,695,888 | 9/1987 | Peterson | 358/213.13 |
| 4,695,891 | 9/1987 | Peterson | 358/213.13 |
| 4,713,697 | 12/1987 | Gotou et al. | 358/222 |
| 4,774,402 | 9/1988 | Boeck et al. | 250/201 |
| 4,910,600 | 3/1990 | Kondo | 358/228 |
| 4,945,367 | 7/1990 | Blackshear | 354/81 |
| 4,974,088 | 11/1990 | Sasaki | 358/210 |
| 5,111,288 | 3/1992 | Blackshear | 358/108 |

FOREIGN PATENT DOCUMENTS

| | | | |
|---|---|---|---|
| 0222641 | 5/1987 | European Pat. Off. | H04N 5/335 |
| 2547426 | 12/1984 | France | G02B 13/06 |
| 63-221772 | 9/1988 | Japan | H04N 5/238 |
| 1236779 | 9/1989 | Japan | H04N 5/235 |

*Primary Examiner*—Michael T. Razavi
*Assistant Examiner*—Bipin Shalwala
*Attorney, Agent, or Firm*—Watson Cole Stevens Davis, P.L.L.C.

[57]           ABSTRACT

An object of the present invention is to control the lens iris and shutter speed such that automatic light quantity adjustment is made of an object the image of which is to be picked up without being influenced by the ambient quantity of light. Another object of the present invention is to control the shutter speed of an image pickup camera to pick up the image of a target object during the rotation of a rotational stand without allowing the image to flow asynchronously. An image pickup camera 1 comprises a vertical position detector 12 and a horizontal position detector 13 for detecting the rotational position of the camera 1. Data 21 on control over the quantity of light for the detected positional information 20 is beforehand stored in a correction data storage 14. Correction data 21 for the position information 20 is delivered to the camera 1. A lens iris driver 10 subtracts the correction data 21 from the quantity of light from a lens 2 to produce a signal to automatically control the light quantity of the lens iris 11.

12 Claims, 3 Drawing Sheets

TELEVISION CAMERA HAVING VARIABLE LENS IRIS/SHUTTER BASED ON POSITION/ROTATIONAL SPEED OF CAMERA

This application is a continuation of application Ser. No. 07/891,050, filed Jun. 1, 1992 (abandoned).

BACKGROUND OF THE INVENTION

1. Field of the Invention

The present invention relates to television camera devices installed at automatic cash payment devices in counters of stores and banks.

2. Description of the Prior Art

Conventionally, when a television camera of this type is installed at an automatic cash payment device in a bank or the like so that its single image pickup camera monitors a wide range at a time, the image pickup camera is mounted on a rotational stand, which is rotated at predetermined intervals of time.

At this time, since the brightness of an object, the image of which is to be picked up, fluctuates due to rotation of the camera, it is necessary to cause control the iris of the lens or the shutter speed in accordance with a change in a quantity of light from the object. To this end, the indoor quantity of light is devised so as to be as uniform as possible or a lens is used which has the function of automatically adjusting the quantity of light to thereby cause the iris of the lens to automatically follow a possible change in the quantity of light of the object.

In the conventional television camera devices, the quantity of light of the overall object is automatically adjusted and the iris of the lens is adjusted to the quantity of light. However, if the object to be imaged simultaneously includes a window through which external light is received and a person to be monitored, the iris of the lens must be adjusted to the person to be monitored (hereinafter referred to as a moving object). However, this adjustment is influenced by objects, such as a landscape, which can be viewed through the window in addition to the person (hereinafter referred to as a fixed object). If the iris of the lens is adjusted in accordance with such an object, with reference to automatic light quantity adjustment, the iris would be adjusted to the window through which external light is received. Thus, an image picked up of the face of a person who is the moving object would be undesirably dark.

Also, when the light sensitive time of the image pickup camera is changed in accordance with a change in the shutter speed of the camera under the above image pickup conditions to thereby make light quantity adjustment, the shutter speed would be adjusted to the window through which the external light is received and the picked up image of the face of the person who is the moving object would be undesirably dark.

During the operation of the stand, the video signal would flow asynchronously and undesirably the object would not be clearly determined.

SUMMARY OF THE INVENTION

The present invention solves such conventional problems. It is an object of the present invention to provide an excellent television camera device which detects a position where the image pickup camera picks up the image of an object, sets a lens iris or a shutter speed in consideration of a quantity of light of a fixed object and realizes optimal image pickup of the object to be monitored.

It is another object of the present invention to provide an excellent television camera which detects the rotational speed of an image pickup camera, operates an electronic shutter at an appropriate speed relative to the rotational speed of the camera to thereby realize image pickup which does not flow asynchronously during the rotation of the camera.

In order to achieve the above objects, according to the present invention, an image pickup camera with automatic light quantity adjustment is placed on a rotational stand which can rotate horizontally and vertically. Means are provided for detecting the rotational position of the stand. A storage for storing data on control of the lens iris for data on the rotational position of the camera obtained by the detecting means is provided to thereby feed data on the control of the lens iris for the rotational position of the stand to automatic adjustment of light quantity to control the lens iris.

An image pickup camera with automatic light quantity adjustment is placed on a rotational stand which is able to rotate horizontally and vertically. Means are provided for detecting the rotational position of the rotational stand. Means are provided for storing data on control over a lens iris for the data on the rotational position of the camera obtained by the detecting means whereby the control data on the lens iris for the rotational position of the camera is delivered to the automatic light quantity adjustment to thereby control the iris.

An image pickup camera with a variable shutter function is placed on a rotational stand which is able to rotate horizontally and vertically. Means are provided for detecting the rotational position of the rotational stand. Means are provided for storing data on control over a lens iris for the data on the rotational position of the camera obtained by the detecting means whereby the control data on a shutter speed for the rotational position of the camera is delivered to the camera to thereby control the shutter.

An image pickup camera with a variable shutter function is placed on a rotational stand which is able to rotate horizontally and vertically. Means are provided for detecting the rotational speed of the rotational stand. Means are provided for storing data on control over a shutter speed for the data on the rotational speed of the camera obtained by the detecting means whereby the control data on a shutter speed for the rotational speed of the camera is delivered to the camera to thereby control the shutter.

Therefore, according to the present invention, data on control over the rotational position of the camera is obtained from the storage, so that control of the automatic light quantity adjustment with this data advantageously provides the adjustment of the lens iris and shutter speed to a moving object to be monitored without following a fixed object.

Since data on control over the rotational speed of the camera can be extracted from the storage, control over the shutter speed with this data prevents a video signal from flowing asynchronously during rotation and a deterioration in the sensitivity when the stand is at a stop.

DESCRIPTION OF THE PREFERRED EMBODIMENTS

Figure 1:
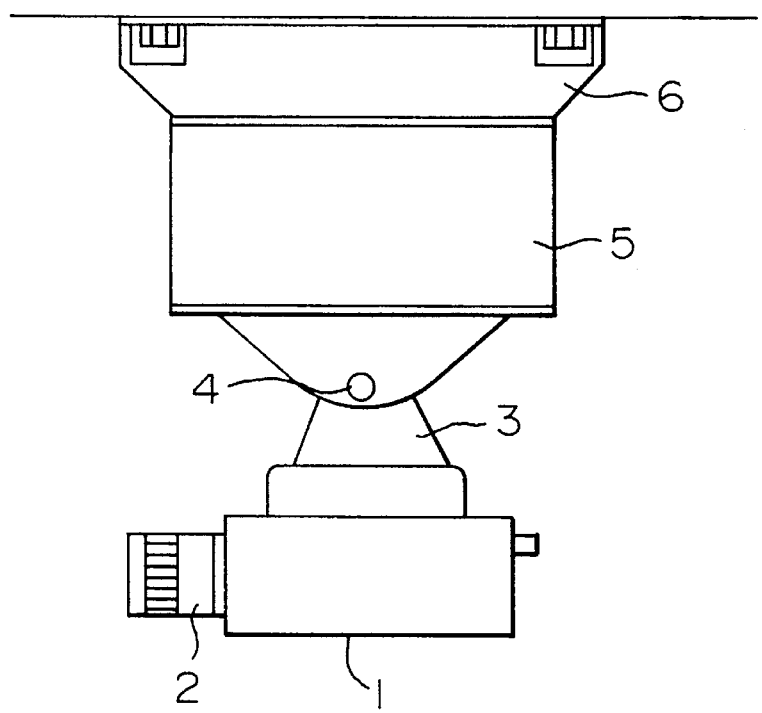
FIG. 1 is a front view of a television camera device indicative of an embodiment of the present invention.
Figure 2:
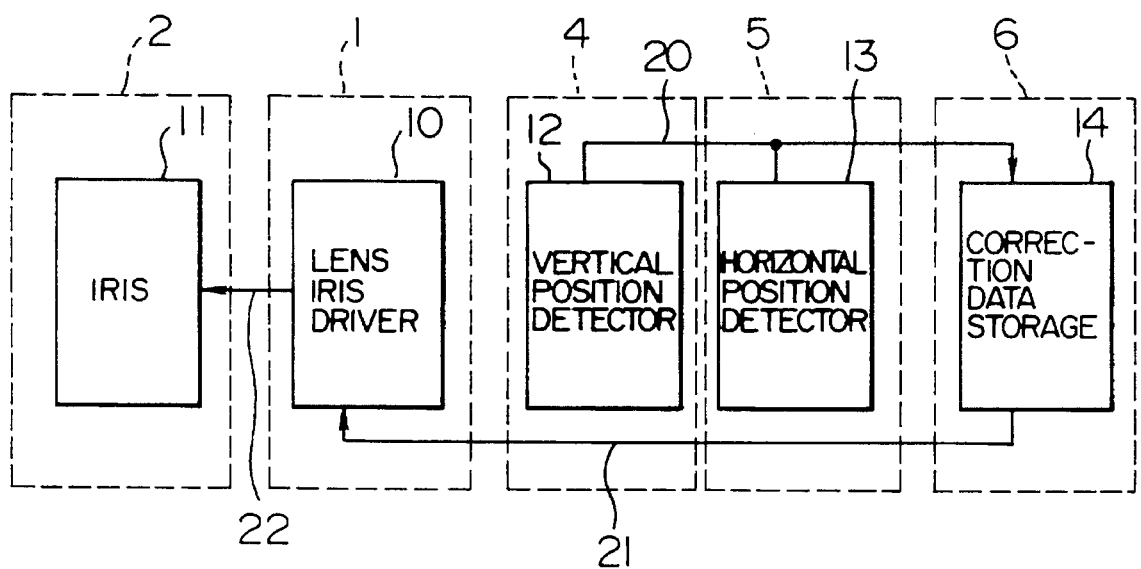
FIG. 2 is a block diagram of a television camera device indicative of a first embodiment of the present invention.

FIG. 1 is a front view of a television camera device indicative of an embodiment of the present invention. FIG. 2 is a block diagram of a television camera device as a first embodiment of the present invention.

In FIG. 1, reference numeral 1 denotes an image pickup camera with the function of automatically adjusting a quantity of light incident thereto. Reference numeral 2 denotes a lens which is able to change its iris in accordance with a control signal from the camera 1. Reference numeral 3 denotes a support stand on which the camera 1 is fixed; 4, a vertical rotational stand which rotates vertically through the support stand 3 which supports the camera 1; and 5, a horizontal rotational stand which rotates horizontally through the support stand 3 like the vertical stand 4. Reference numeral 6 denotes a storage device which stores data on correction of the lens iris with a position to which the camera 1 has moved. The storage device is fixed to the ceiling, for example, by bolts.

The lens iris control of the internal functions shown in FIG. 1 will be described with reference to FIG. 2.

In FIGS. 1 and 2, the same reference numeral denotes the same device with the same characteristic. Thus, in FIG. 2, its further description will be omitted. In FIG. 2, reference numeral 10 denotes a lens iris driver which makes automatic light quantity adjustment which controls the iris of the lens 2 in accordance with the quantity of light of an input image and is built in the cameral 1. Reference numeral 11 denotes an iris which is built in the lens 2. Reference numeral 12 denotes a vertical position detector which has data on the vertical rotation position of the camera 1 and is built in the vertical rotation stand 4. Reference numeral 13 denotes a horizontal position detector which has data on the horizontal rotation of the cameral 1 and is built in horizontal rotational stand 5. Reference numeral 14 denotes a storage device for correction data which stores data on correction of the lens iris for data on the position of the camera 1 obtained by the vertical and horizontal position detectors 12 and 13.

The operation of the device will be described below.

In FIG. 2, the position to which the camera 1 has moved is obtained as position data 20 by the vertical position detector 12 and the horizontal position detector 13 and is fed to correction data storage device 14. The position data 20 becomes a vertical and a horizontal position addresses in storage device 14, which stores correction data on the lens iris in correspondence to these addresses, and this correction data is delivered as correction data 21 to the lens iris driver 10. When the driver 10 receives no correction data, it makes automatic light quantity adjustment using only a quantity of light from the object. When it receives correction data 21, it subtracts a correction value from the quantity of light from the object and makes automatic light quantity adjustment on the basis of the result.

Figure 3A:
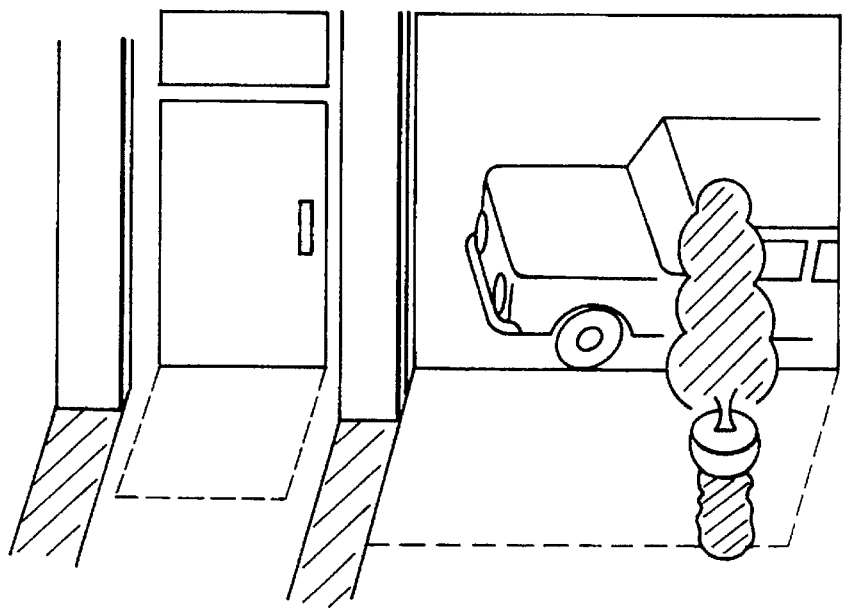
FIG. 3A shows a scene of the vicinity of a glass covered inlet in a bank the image of which is to be picked up by the present device.

When this device is used on a floor, for example, of a bank on which an automatic cash payment device is installed to pick up the image of the vicinity of an inlet door covered with glass such as that shown in FIG. 3A, very bright external light enters into the bank through its inlet. On the other hand, a person who enters into the bank through the inlet is irradiated with only indoor illumination. Therefore, when the image of such object is picked up using only automatic light quantity adjustment, the lens iris is adjusted under the influence of a fixed object which is exposed to the external light, so that image obtained of the face of the person would be dark and clear image pickup cannot be performed. The inventive device provides correction data corresponding to such position data to correct the automatic light quantity adjustment so as to produce a clearer image of the person's face in a bright state. In this case, the lens iris is set to a half iris value (+0.5), by which the iris driver 10 subtracts correction data (+0.5) to thereby open the iris 11 for image pickup.

Figure 3B:
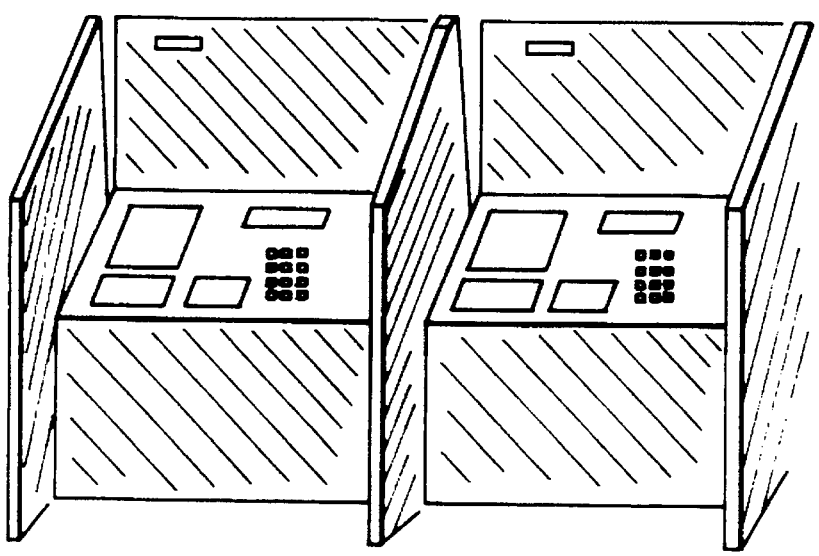
FIG. 3B shows a landscape of an automatic cash payment device the image of which is to be picked up by the present device.

When the image of a person who uses an automatic cash payment device coated with a relatively dark color, such as shown in FIG. 3B, is picked up using only automatic light quantity adjustment, the lens iris would be opened under the influence of the color of the payment device housing, so that the image of the person would be picked up as a whitish one and thus would not be clearly picked up. The present device provides correction data in a correspondence to position data on the position of the camera as viewing such a fixed object so as to able to pick up the image of the person even if automatic light quantity adjustment is made. In this case, the iris value is set to a half closed value (−0.5). By this setting, the lens driver 10 subtracts correction data (−0.5) to thereby reduce the iris 11 for image pickup.

As just described above, according to the above embodiment, information on the position of the camera 1 can be detected by the vertical and horizontal position detectors 12 and 13, so that if correction data for the fixed object is added to the data on the position, automatic light quantity adjustment which is not influenced by the fixed objects is made even if the quantity of light is fluctuated by the rotational stand. Therefore, the image of an object, such as a person to be monitored, can be clearly picked up, advantageously.

By adding a clock function to the correction data storage 14 to determine whether it is now in the daytime or at night, correction data may be added or not. In this case, different lens iris correction is provided depending on whether it is now in the daytime or at night.

In the automatic light quantity adjustment by the lens iris driver 10 of the above embodiment, the contour of an image of a scene to be observed may be either only the center of the picture or a lower half of the picture in place of the overall area of the picture. Alternately, the picture may be divided into fine segments with corresponding coefficients and the sum of the product of the respective light quantities of the segments and the corresponding coefficients may be the overall quantity of light, in which case better automatic light quantity adjustment is provided to thereby produce a clearer image of an object to be monitored without being influenced by the ambient objects, advantageously.

A second embodiment will be described next.

Figure 4:
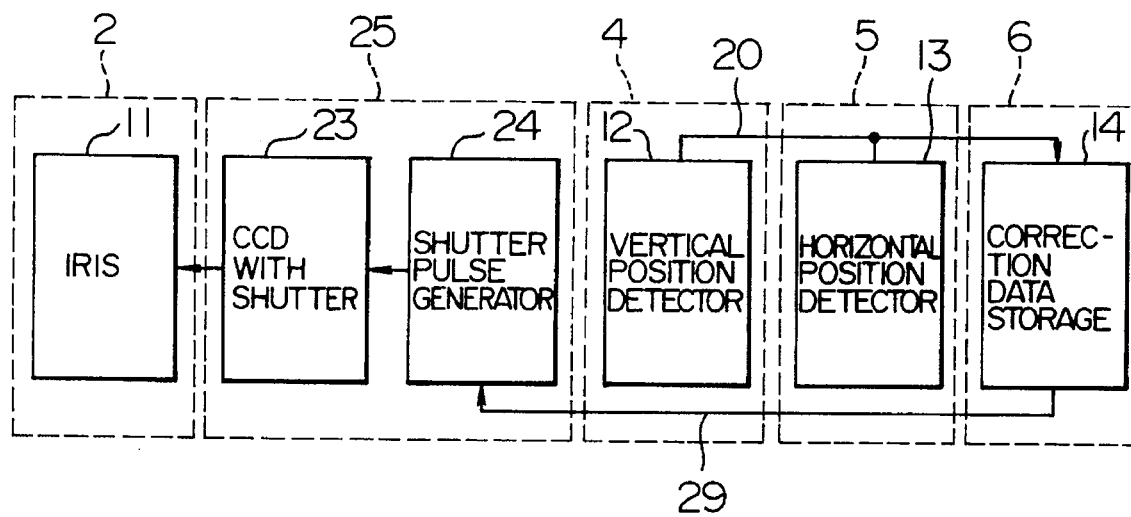
FIG. 4 is a block diagram of a television camera device indicative of a second embodiment of the present invention.

FIG. 4 is a block diagram of the second embodiment of the present invention.

In FIGS. 4, 1 and 2, the same reference numeral denotes the same device with the same characteristic and its further description will be omitted. In FIG. 4, reference numeral 23 denotes a CCD device with a shutter to control the light sensitive time on the basis of the light quantity of an input image. Reference numeral 24 denotes a shutter pulse generator which controls the speed of the shutter pulse of the CCD device 23 and is built in an image pickup camera 25 with a variable shutter. Reference numeral 11 denotes an iris built in the lens 2. Reference numeral 12 denotes a vertical position detector which has information on the vertical rotational position of the camera 1 and is built in the vertical rotational stand 4. Reference numeral 13 denotes a horizontal position detector which has information on the horizontal rotation of the camera 25 and is built in the horizontal rotational stand 5. Reference numeral 14 denotes a correction data storage which stores data on correction of the shutter speed for the information on the position of the camera 25 obtained from the vertical and horizontal position detectors 12 and 13.

The operation of the camera of the second embodiment will be described next.

In FIG. 4, the position to which the camera 25 has moved is obtained as position data 20 from the vertical and horizontal position detectors 12 and 13 and delivered to correction data storage 14. The position data 20 becomes vertical and horizontal position addresses in the correction data storage. The correction data storage 14 stores correction data for the shutter speed at these addresses and the correction data is delivered as shutter speed correction data 29 to the shutter pulse generator 24. When no correction data is delivered to the generator 24, the lens iris 11 is normally open. The shutter pulse generator 24 controls the light sensitive time of the CCD device 23 to perform automatic light quantity adjustment using only the quantity light from the object. When the shutter speed correction data 21 is delivered to the generator 24, the correction value is subtracted from the quantity of light of the object and automatic light adjustment is made on the basis of the resulting value.

When the present device is used on a floor of a bank on which an automatic cash payment devices are installed to thereby pick up the image of an inlet covered with glass and its vicinity, as shown in FIG. 3A, very bright external light enters into the bank through the inlet. On the other hand, a person who enters into the bank through its inlet is irradiated with only indoor illumination. Therefore, if the image of such object is picked up using only automatic light quantity adjustment, the shutter is influenced by the fixed objects exposed to external light and the face of the person would be dark and clear image pickup cannot be performed. Even if correction data is provided in response to the position data to thereby make automatic light quantity adjustment, control is provided such that the image of the person's face can brightly be picked up. In this case, the shutter speed is adjusted so as to be lowered by 1/1000 (sec). By such setting, the correction data of 1/1000 (sec) is subtracted in the shutter pulse generator 24, so that the actual quantity of light is reduced and the CCD device with the shutter can brightly pick up the image of the target person.

When the image of a person who uses an automatic cash payment device coated with a relatively dark color shown in FIG. 3B is picked up using only automatic light quantity adjustment, the shutter speed is subjected to a control which is influenced by the color of the payment device housing, so that the image of the person would be picked up as a whitish one and cannot clearly be picked up. Even if correction data is added to the data on the position of the camera 1 which is under influence of such as fixed object to thereby make automatic light quantity adjustment, control is provided such that the image of the person is brightly picked up. In this case, the shutter speed is adjusted so as to be increased by 1/1000 (sec). By such setting, the correction data of 1/1000 (sec) is subtracted in the shutter pulse generator 24, so that the CCD device with the shutter can clearly pick up the image of a darkened target person.

As just described above, according to the present embodiment, the information on the position of the camera 1 can be detected by the vertical and horizontal position detectors 12 and 13, so that if correction data for fixed objects is added in response to the position information on the camera, automatic light quantity adjustment is made without being influenced by the fixed objects even if the light quantity fluctuates due to the rotation of the rotational stand. Therefore, the image of an object, to be monitored such as a person, can clearly be picked up, advantageously.

Figure 5:
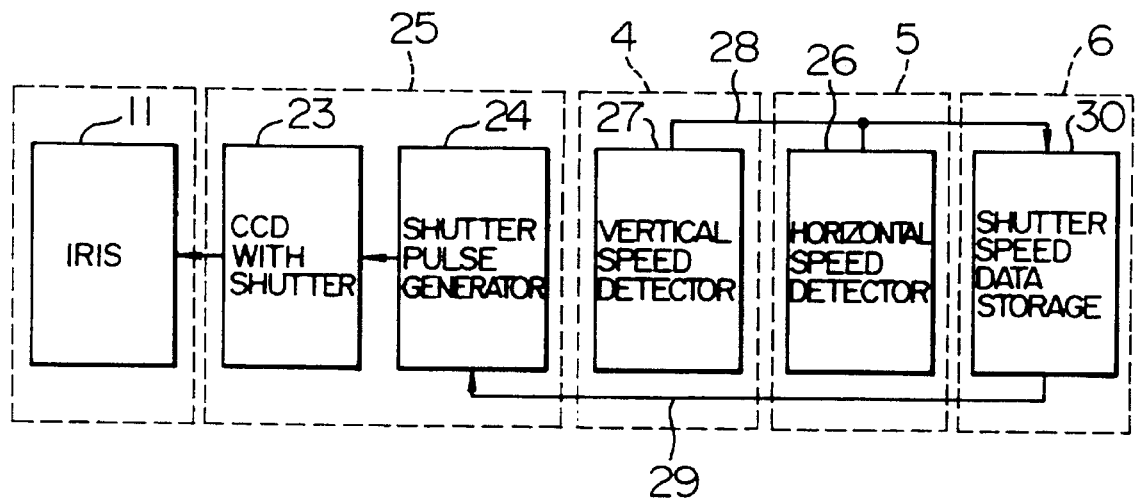
FIG. 5 is a block diagram of a television camera device indicative of a third embodiment of the present invention.

FIG. 5 is a block diagram of a third embodiment of the present invention.

In FIGS. 5, 1, 2 and 4, the same reference numeral denotes the same device with the same characteristic and its further description will be omitted. In FIG. 5, reference numeral 23 denotes a CCD device with a shutter to control the light sensitive time on the basis of the light quantity of an input image. Reference numeral 24 denotes a shutter generator which controls the speed of the shutter of the CCD device 23 and is built in an image pickup camera 25 with a variable shutter. Reference numeral 27 denotes a vertical speed detector which has information on the vertical rotational speed of the camera 1 and is built in the vertical rotational stand 4. Reference numeral 26 denotes a horizontal speed detector which has information on the horizontal rotation speed of the camera 25 and is built in the horizontal rotational stand 5. Reference numeral 30 denotes a shutter speed data storage which stores data on the shutter speed for the information on the speed of the camera 25 obtained from the vertical and horizontal speed detectors 27 and 26.

The operation of the camera of the third embodiment will be described next.

In FIG. 5, the moving speed of the camera 25 is obtained as speed data 20 from the vertical and horizontal speed detectors 27 and 26 and is delivered to the shutter speed data storage 30. The speed data 28 becomes vertical and horizontal rotational speed addresses in the shutter speed data storage 30 which stores shutter speed data at these addresses and the data is delivered as shutter speed data 29 to the shutter pulse generator 24. This data controls the light sensitive time interval of the CCD 23 and hence the shutter speed.

This device has the advantage that the image signal thus obtained is recorded in a VTR and is reproduced in slow motion or frame feeding to thereby clearly ascertain the image without causing the same to flow asynchronously during the rotation.

As will be clear from the description of the above embodiment, the present invention can obtain from the storage data on control over automatic light quantity adjustment corresponding to the moving position of the camera. Thus, automatic light quantity adjustment is made with such data to thereby follow a moving object to be monitored without causing the lens iris and shutter speed to follow fixed objects, so that the image of a moving object is clearly picked up, advantageously.

Since data on the shutter speed corresponding to the rotational speed of the camera can be obtain out of the storage to control the shutter with this data, appropriate shutter control corresponding to the rotational speed is provided over the camera to thereby clearly pick up the image of the desired object in a period in which the camera is being rotated, advantageously.

We claim:

1. A television camera device comprising:

an image pickup camera moveable in at least one direction and including a lens iris and means for (i) adjusting said lens iris automatically in accordance with a quantity of incoming light from a scene, including an object and a background, being imaged to achieve an adjusted lens iris and (ii) correcting the adjusted lens iris in accordance with a correction datum to image said object while reducing influences of light from the background;

means for moving said camera to image said object;

detecting means for detecting a position of said camera in said at least one direction and outputting a position signal indicating said position; and storing means, receiving said position signal, for storing correction data to correct the adjusted lens iris, said correction data being predetermined and including a plurality of data portions corresponding to a plurality of possible positions of said camera, said storing means outputting one of said plurality of data portions to said camera as said correction datum in response to said position signal, thereby enabling production of a clearer image of said object.

2. A television camera device comprising:

an image pickup camera moveable in at least one direction and including a shutter and means for (i) adjusting a shutter speed of said shutter automatically in accordance with a quantity of incoming light from a scene, including all object and a background, being imaged to achieve an adjusted shutter speed and (ii) correcting said adjusted shutter speed in accordance with a correction datum to image said object while reducing influences of light from said background;

means for moving said camera to image said object;

detecting means for detecting a position of said camera in said at least one direction-and outputting a position signal indicating said position; and storing means, receiving said position signal, for storing correction data to correct said adjusted shutter speed, said correction data being predetermined and including a plurality of data portions corresponding to a plurality of possible positions of said camera, said storing means outputting one of said data portions to said camera as said correction datum in response said position signal, thereby enabling production of a clearer image of said object.

3. A television camera device comprising:

an image pickup camera moveable in at least one direction and including a shutter and means for (i) adjusting a shutter speed of said shutter automatically in accordance with a quantity of incoming light from a scene, including an object and a background, being imaged to achieve an adjusted shutter speed and (ii) correcting said adjusted shutter speed in accordance with a correction datum to image said object;

means for moving said camera to image said object;

detecting means for detecting a speed of movement of said camera in said at least one direction and outputting a speed signal indicating said speed of said camera; and storing means, receiving said speed signal of said camera, for storing correction data to adjust said shutter speed, said correction data being predetermined and including a plurality of data portions corresponding to a plurality of possible speeds of said camera, said storing means outputting one of said data portions to said camera as said correction datum in response to said speed signal of said camera, thereby enabling production of a clearer image of said object as said camera is rotated.

4. A television camera device according to claim 1, wherein said storing means further comprises a clock for determining a current time of day to select said one of said data portions to be output to said camera in accordance with said current time of day.

5. A television camera device according to claim 1, wherein said moving means comprises rotating means for rotating said camera.

6. A television camera device according to claim 2, wherein said moving means comprises rotating means for rotating said camera.

7. A television camera device according to claim 1, wherein said storing means outputs said one of said data portions to correct the adjusted lens iris to allow only a predetermined portion of said quantity of incoming light to pass through said lens iris, thereby enabling when said object comprises a person, production of a clearer image of said person's face.

8. A television camera device according to claim 2, wherein said storing means outputs said one of said data portions to correct said adjusted shutter speed to allow only a predetermined portion of said quantity of incoming light to pass through said shutter, thereby enabling, when said object comprises a person, production of a clearer image of said person's face.

9. A television camera device according to claim 3, wherein said storing means outputs said one of said data portions to correct said adjusted shutter speed to allow only a predetermined portion of said quantity of incoming light to pass through said shutter, thereby enabling, when said object comprises a person, production of a clearer image of said person's face.

10. A television camera device for production of a clear image of a desired object among plural objects surrounded by background objects in a preselected scene, said plural objects and background objects being at respective different locations, said device being fixedly located with a predetermined spatial relation to said background objects and comprising:

an image pickup camera rotatable in at least one direction and including a lens iris;

means for rotating said camera to control an angular position of said camera to image said desired object;

detecting means for detecting said angular position of said camera in said at least one direction and outputting an angular position signal indicating the angular position;

means for performing an automatic iris adjustment of said lens iris of said camera automatically in response to (i) a quantity of incoming light from said scene and (ii) an iris control signal to correct said automatic iris adjustment to achieve an adjusted lens iris for imaging said desired object in order to produce a clear image of said desired object and to offset influences of light incoming from said background objects, said control signal corresponding to the angular position detected by said detecting means; and storing means, receiving said angular position signal, for storing correction data for performing said automatic iris adjustment, said correction data including a plurality of data portions corresponding to a plurality of possible angular positions of said camera, said storing means outputting to said camera one of said data portions as said iris control signal in response to said angular position signal, thereby enabling said camera to produce a clear image of said desired object.

11. A television camera device for production of a clear image of a desired object among plural objects surrounded by background objects in a preselected scene, said plural objects and background objects being at respective different locations, said device being fixedly located with a predetermined spatial relation to said background objects and comprising:

an image pickup camera rotatable in at least one direction and including a shutter;

means for rotating said camera to control an angular position of said camera to image said desired object;

detection means for detecting said angular position of said camera in said at least one direction and outputting an angular position signal indicating the angular position;

means for performing all automatic shutter speed adjustment of said shutter of said camera automatically in response to (i) a quantity of incoming light from said scene and (ii) a shutter speed control signal to correct said automatic shutter speed adjustment to achieve an adjusted shutter speed for imaging said desired object in order to produce a clear image of said desired object, said control signal corresponding to the angular position detected by said detecting means; and storing means, receiving said angular position signal, for storing correction data for performing said automatic shutter speed adjustment, said correction data including a plurality of data portions corresponding to a plurality of possible angular positions of said camera, said storing means outputting to said camera one of said data portions as said shutter speed control signal in response to said angular position signal, thereby enabling said camera to produce a clear image of said desired object.

12. A television camera device for production of a clear image of a desired object among plural objects surrounded by background objects in a preselected scene, said plural objects and background objects being at respective different locations, said device being fixedly located with a predetermined spatial relation to said background objects and comprising:

an image pickup camera rotatable in at least one direction and including a shutter;

means for rotating said camera to control an angular position of said camera to image said desired object;

means for detecting a rotational speed of movement of said camera in said at least one direction and outputting a speed signal indicating said rotational speed;

means for performing an automatic shutter speed adjustment of said shutter of said camera automatically in response to (i) a quantity of incoming light from said scene and (ii) said speed signal to correct said automatic shutter speed adjustment to achieve an adjusted shutter speed for imaging said desired object in order to produce a clear image of said desired object, said control signal corresponding to the rotational speed detected by said detecting means; and storing means, receiving said speed signal, for storing correction data for performing said automatic shutter speed adjustment, said correction data including a plurality of data portions corresponding to a plurality of possible rotational speeds of said camera, said storing means outputting to said camera one of said data portions as said shutter speed control signal in response to said speed signal, thereby enabling said camera to produce a clear image of said desired object.

* * * * *